July 20, 1965

H. KELLEY 3,195,287

BOARD BUNDLER

Filed Oct. 9, 1961

INVENTOR.
HUGH KELLEY
BY
Harold B. Hood
Attorney

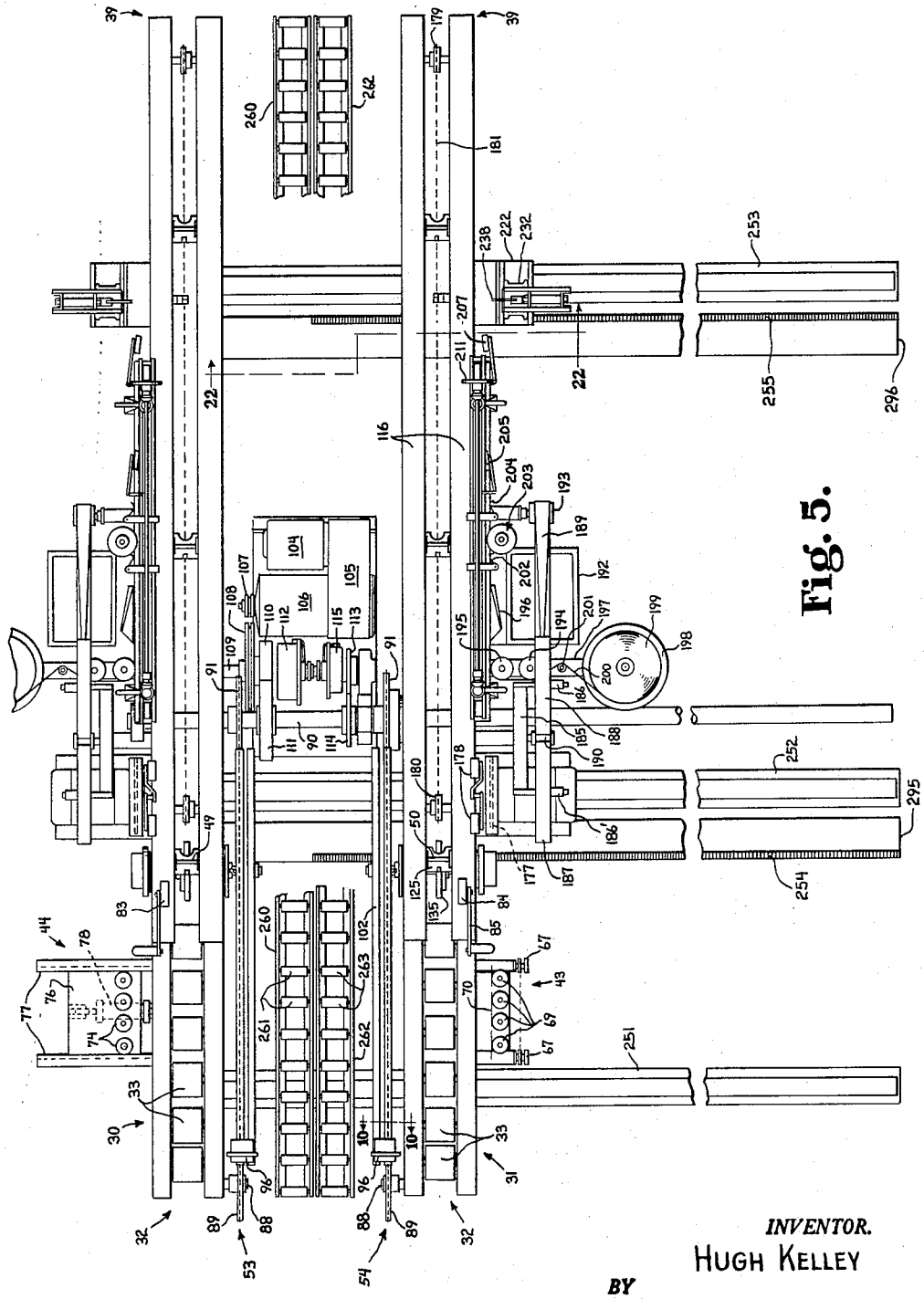

July 20, 1965

H. KELLEY 3,195,287

BOARD BUNDLER

Filed Oct. 9, 1961

INVENTOR.
HUGH KELLEY

BY

Harold B. Hood
Attorney

July 20, 1965

H. KELLEY 3,195,287

BOARD BUNDLER

Filed Oct. 9, 1961

INVENTOR.
HUGH KELLEY
BY
Harold B. Hood
Attorney

INVENTOR.
HUGH KELLEY
BY
Harold B. Hood
Attorney

July 20, 1965  H. KELLEY  3,195,287
BOARD BUNDLER
Filed Oct. 9, 1961  9 Sheets-Sheet 6

*INVENTOR.*
HUGH KELLEY
BY
Harold B. Hood
*Attorney*

July 20, 1965 H. KELLEY 3,195,287
BOARD BUNDLER
Filed Oct. 9, 1961 9 Sheets-Sheet 7
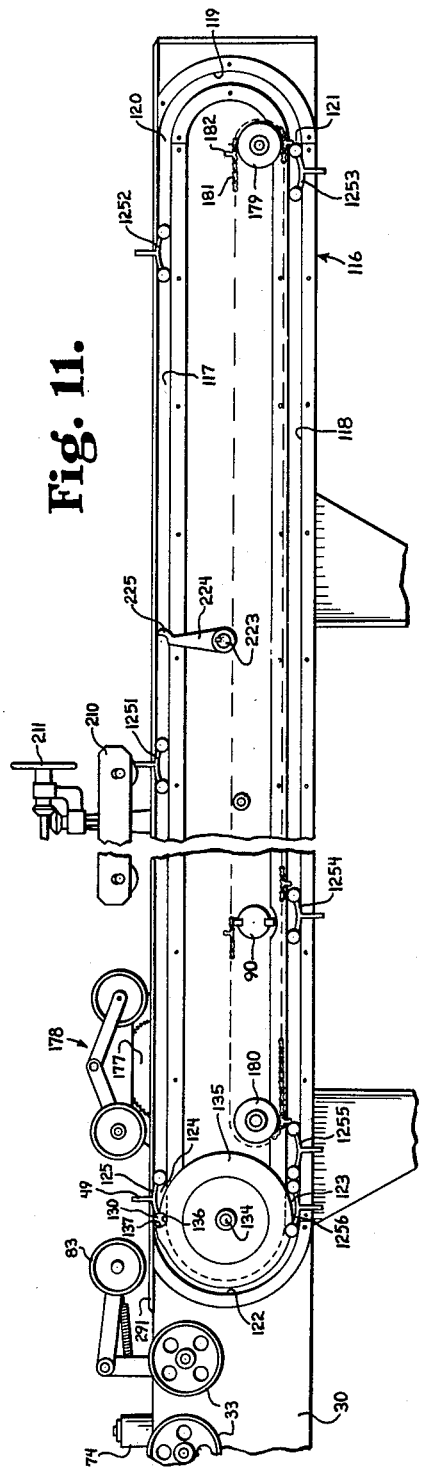
Fig. 11.
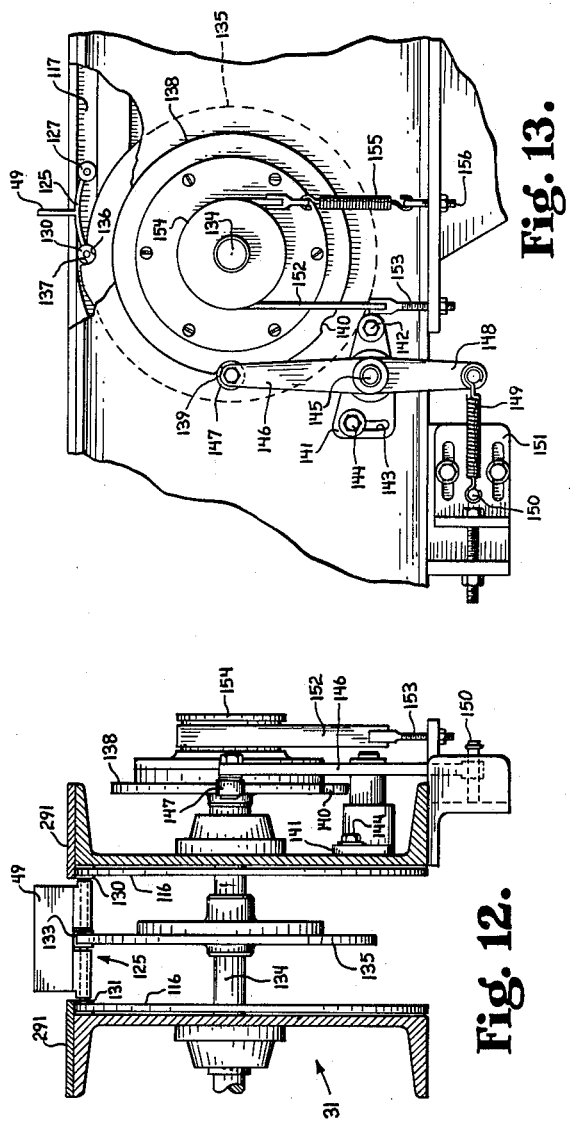
Fig. 13.
Fig. 12.
INVENTOR.
HUGH KELLEY
BY
Harold B. Hood
Attorney

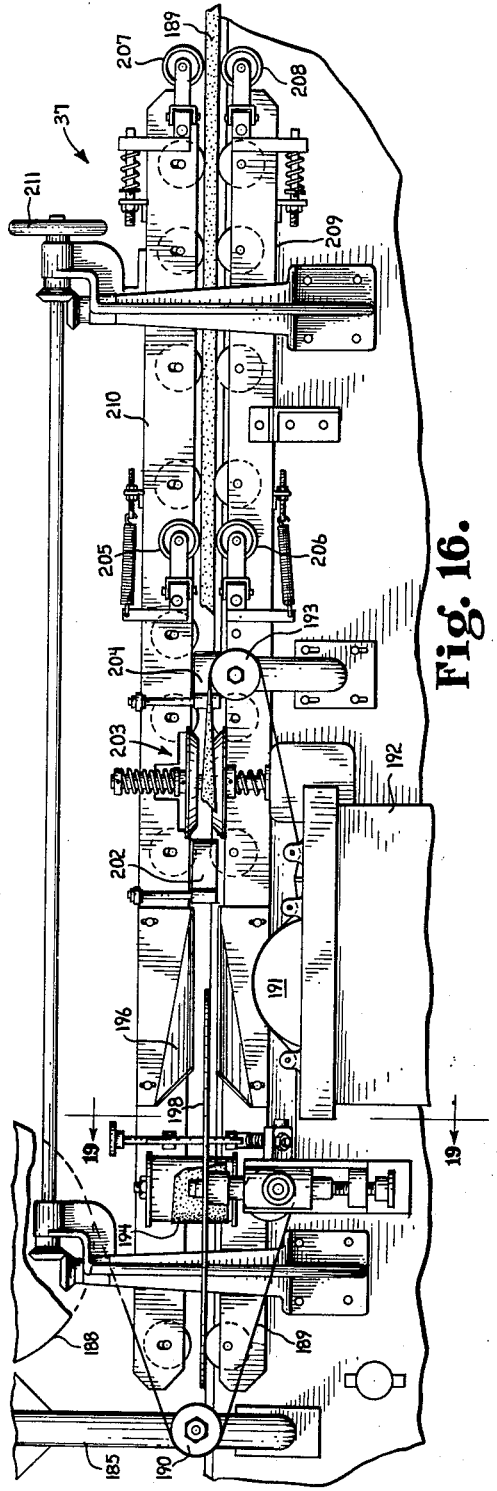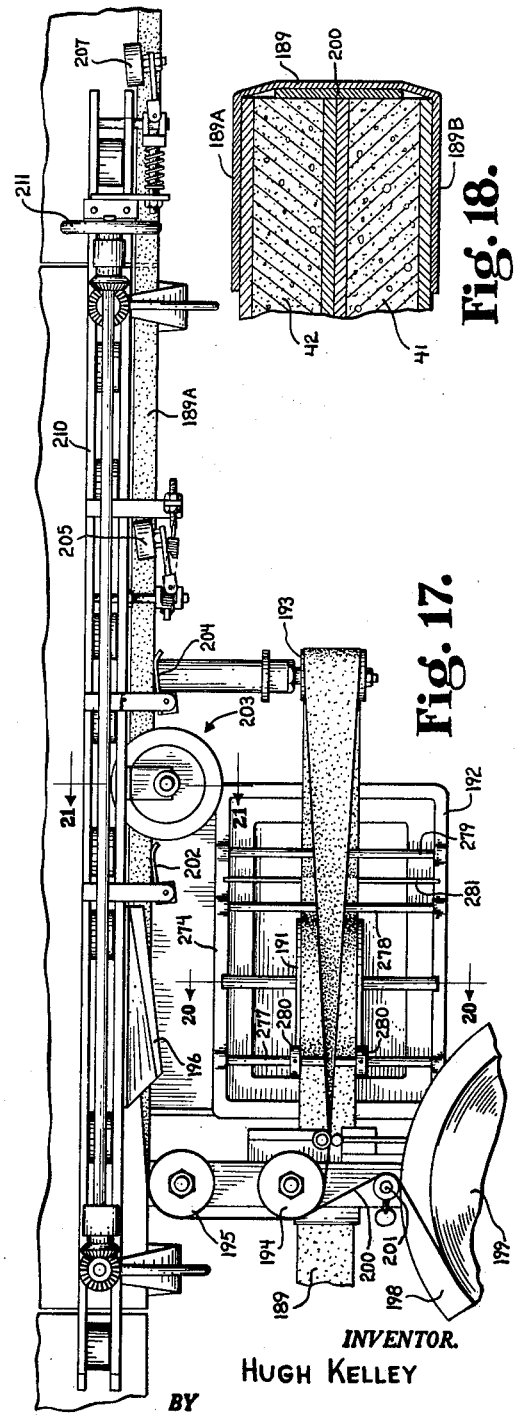

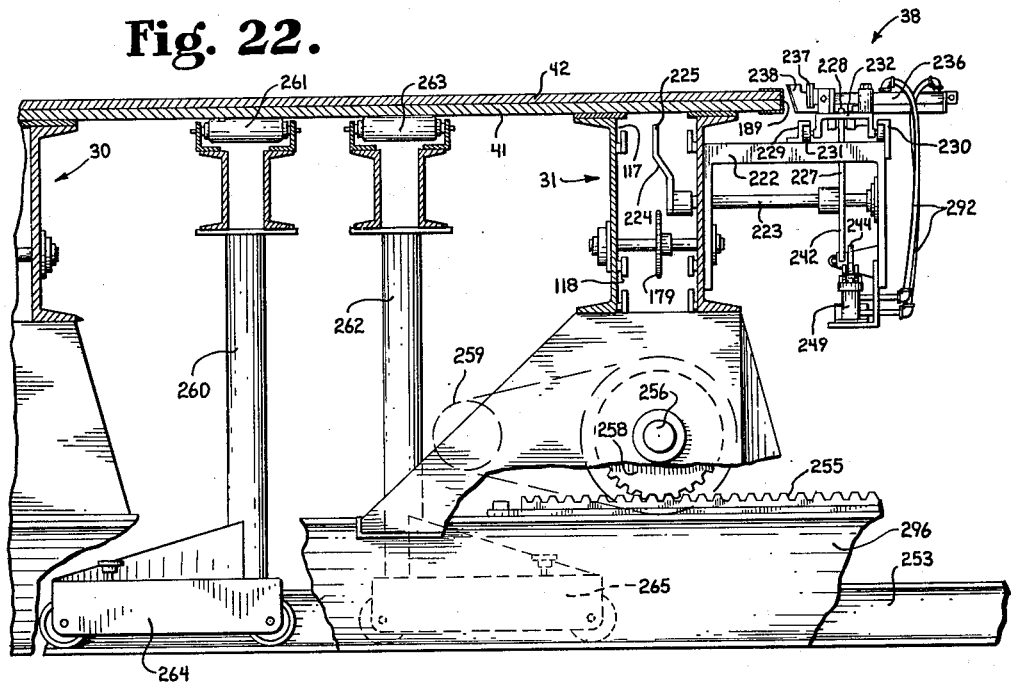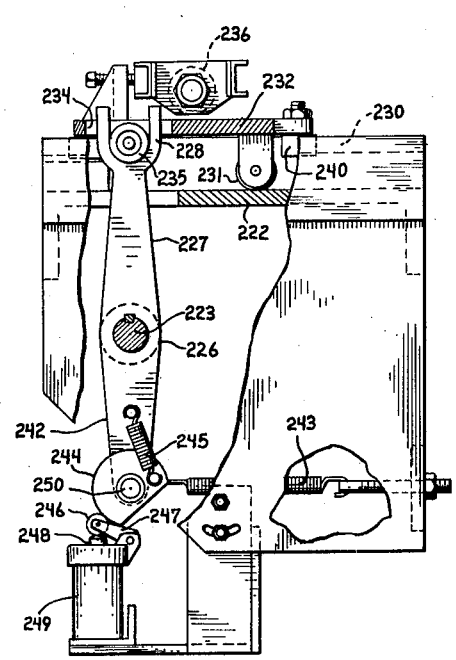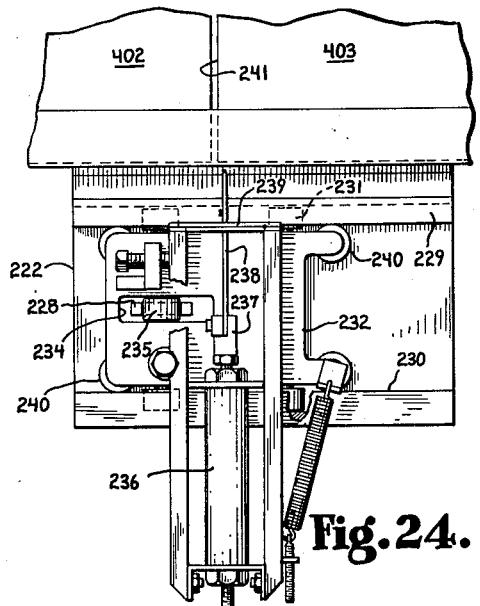

United States Patent Office 3,195,287
Patented July 20, 1965

3,195,287
BOARD BUNDLER
Hugh Kelley, Enterprise, Kans., assignor to The J. B. Ehrsam & Sons Manufacturing Company, Enterprise, Kans., a corporation of Kansas
Filed Oct. 9, 1961, Ser. No. 143,886
19 Claims. (Cl. 53—137)

The present invention relates to a bundling machine and is concerned primarily with the provision of an improved machine for receiving relatively rigid, flat pieces, in stacks of two or more, straightening or justifying the lateral ends of the pieces in a pile, straightening or justifying the leading and trailing edges of the pieces in a pile, trimming the lateral ends of the pieces, then moving the successive stacks along a travel path, step-by-step, past a taping station where continuous strips of tape are applied to the lateral ends of the successive stacks to bind together the several pieces of each stack, and then moving the stacks step-by-step past a cutting station at which the tapes so applied to the opposite ends of the stacks are cut between adjacent stacks. It is a primary object of the invention to provide novel means for moving such stacks along such a travel path while maintaining a predetermined, narrow spacing or separation between adjacent stacks in order that the above-mentioned cutting means may inevitably sever the tapes within such narrow spacing between the stacks.

A further object of the invention is to provide a machine of the character above-described in which the operations set forth will be automatically carried out so long as stacks of pieces are fed to the machine.

A further object of the invention is to provide, in such a machine, novel pusher means necessary for so advancing stacks along such a travel path, such means being of a character such that it will accommodate itself, without adjustment, to the handling of work pieces of any desired, preselected dimension, measured in the direction of movement of pieces along the travel path. That is, while the pieces being handled in any one period of operation of the machine must be uniform in their dimensions measured in the direction of work travel, nevertheless that dimension may be preselected, for any one work period, at any value within a wide range, without necessitating adjustment of the machine.

Another object of the invention is to provide novel means for maintaining the desired separation between adjacent stacks throughout the operation of the machine.

Still another object of the invention is to provide novel means whereby such a machine may be adjusted to accommodate work pieces of varying dimensions measured in a direction transverse to the direction of travel of work through the machine.

Still other objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

FIG. 5 (Sheet 2) is a plan view of the machine, parts being broken away for clarity of illustration;

FIG. 11 (Sheet 6) is an enlarged, longitudinal, fragmental elevation of my novel means for maintaining accurate separation between adjacent stacks of work pieces during travel thereof through the machine;

FIG. 12 (Sheet 6) is a further enlarged, transverse section of the spacer lug positioning means;

FIG. 13 (Sheet 6) is a fragmental view taken from the right hand side of FIG. 12;

FIG. 16 (Sheet 7) is an enlarged, fragmental elevation illustrating the taping mechanism;

FIG. 17 (Sheet 7) is a top plan view of the mechanism illustrated in FIG. 16;

FIG. 18 (Sheet 7) is an enlarged, fragmental, transverse section taken substantially on the line 18—18 of FIG. 6 and looking in the direction of the arrows;

FIG. 22 (Sheet 9) is an enlarged, fragmental section taken substantially on the line 22—22 of FIG. 5 and looking in the direction of the arrows;

FIG. 23 (Sheet 9) is a further enlarged, fragmental elevation taken from the right hand side of FIG. 22, with parts broken away or shown in section for clarity of illustration;

FIG. 24 (Sheet 9) is a fragmental, plan view of the mechanism shown in FIG. 23.

Figure 1:
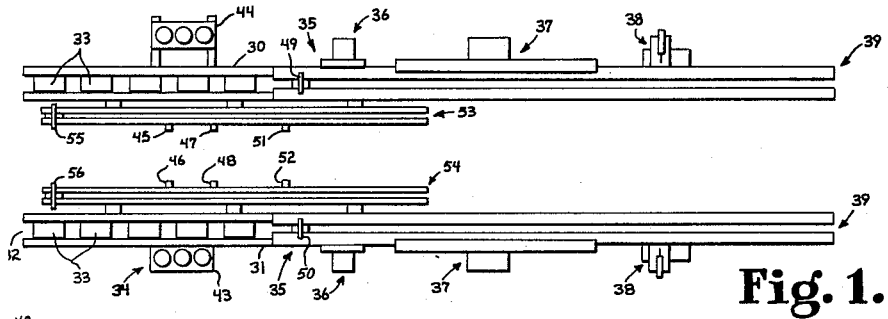
FIGS. 1 to 4 (Sheet 1) are semi-schematic plan views of the machine showing the parts in the positions which they assume at four successive steps in the operative cycle of the machine.

The machine of the present disclosure has been designed primarily for handling plaster board, and it has been illustrated and will be described in that connection. Plaster board is usually made with one "finished" side or face and one "unfinished" side or face; and it is desirable to store and ship such material in bundles of two boards, arranged with their "finished" sides in facing engagement in order that those faces of the boards may be guarded against soil or scarring. It is customary to secure the two boards of a bundle together by means of adhesive tape applied to the ends of the two boards in the bundle. Thus, the present machine is designed to receive boards in stacks of two, justify the edges and the ends of the boards, trim the ends, press the boards together and apply tape across the ends of the boards, thus forming a bundle, sever the binding tapes between adjacent bundles, and discharge single bundles off the end of the machine. Plaster board customarily is made in widths of 24", 32"

or 48″, and in lengths varying from 6′ to 16′. The present machine is so designed as to handle boards of any one of those widths, without adjustment; and to be adjustable to handle boards of any length within the above range.

As the description proceeds, it will become apparent that, while the machine is primarily adapted for handling plaster board, it may be used for handling other, similar materials. Essentially, the work pieces to be moved through the machine must be relatively rigid in the direction of travel through the machine, and must preferably be flat. Work pieces supplied to the machine during any single period of operation must be substantially uniform in their dimensions measured in the direction of travel and in their dimensions measured transversely to the direction of travel, but the machine may be adjusted to accommodate pieces of widely varying transverse dimensions, and will handle pieces of any desired longitudinal dimension without adjustment. It will also be apparent that the machine is adapted to produce bundles containing more than two pieces so long as the aggregate height of a stack is within the range for which the machine is designed.

Referring more particularly to FIGS. 1 to 4 of the drawings, it will be seen that the machine comprises mating frame assemblies 30 and 31 arranged in parallelism to provide a travel path upon which work is supported for movement through the machine. Adjacent the receiving end 32 of said travel path, each frame assembly is provided with a set of continuously-driven pull rolls 33 to which work is intermittently delivered in relatively sloppy stacks of two, either manually or by mechanical means (not shown). Such a stack is indicated generally by the reference numeral 40 and may consist of a lower piece 41 and an upper piece 42. The pull rolls move work past and end-justification station 34, where the lateral ends of the pieces in a stack are justified or squared. Thence, the work moves to an edge-justification station 35 where the leading and trailing edges of the pieces in a stack are squared. Now, the stack is moved past a sawing station 36 where the ends of the pieces in each stack are trimmed, and past a taping station 37 where tape is applied continuously to the lateral ends of stacks moving through the machine. Finally, the work moves past a cutting station 38 where the tapes are severed; and then the individual bundles are discharged from the discharge end 39 of the travel path.

Figure 2:
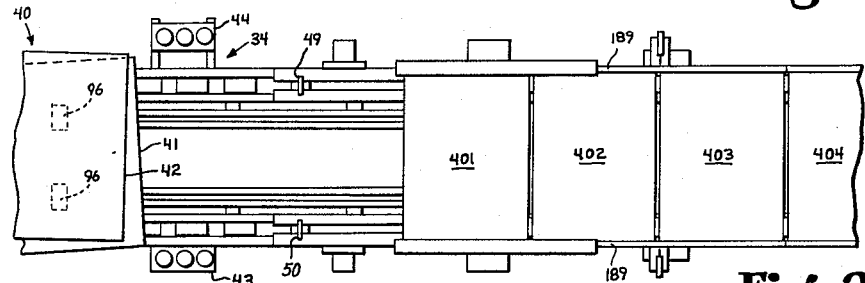

In FIG. 2, I have shown a stack of work pieces, indicated generally by the reference numeral 40, entering the receiving end of the machine. As is illustrated, the pieces 41 and 42 may be rather sloppily arranged as they are fed to the machine. The pull rolls move the stack 40 past the lateral justification station 34 which comprises a normally-stationary but slightly adjustable evener unit 43 arranged adjacent one lateral boundary of the travel path and a movable evener unit 44 arranged adjacent the opposite lateral boundary of the travel path. As the leading edge of the stack 40 enters the region between the units 43 and 44, the lower work piece 41 engages a pair of switches 45 and 46 to activate mechanism, later to be described, to cause the evener unit 44 to move from its position illustrated in FIGS. 1 and 2 into its position illustrated in FIG. 3. Thus, the unit 44 engages the left hand ends of the pieces 41 and 42 to press their right hand ends against the unit 43 to justify the ends of the two pieces in the stack.

Shortly thereafter, the board 41 engages switches 47 and 48 which cause the unit 44 to be returned to its original position.

Through means later to be described, spacer lugs 49 and 50 are positioned and releasably held in the advancing path of the leading edges of the pieces 41 and 42. Just before the leading edge of the stack comes into engagement with the lugs 49 and 50, it will engage a pair of switches 51 and 52 to activate a mating pair of pusher mechanisms 53 and 54, later to be described in detail. The pusher mechanism 53 comprises a pusher 55 and the mechanism 54 comprises a pusher 56. The pushers 55 and 56 are arranged in transverse alignment and are spaced from the lugs 49 and 50 by a distance at least equal to the dimension, measured in the direction of travel, of the widest work pieces to be handled by the machine. Thus, when the leading edge of the stack 40 engages the switches 51 and 52, the trailing edge of the stack will be located to the right of the pushers 55 and 56. Activation of the pusher mechanisms 53 and 54 causes the pushers 55 and 56 to be moved toward the right. Thus, the leading edges of the pieces 41 and 42 are pressed firmly against the releasably-held lugs 49 and 50, in the manner illustrated in FIG. 3, to justify the leading and trailing edges of the pieces 41 and 42. The force with which the pushers are moved toward the right is sufficient, after such justification, to effect the release of the spacer lugs 49 and 50 from their respective positioning and retaining means, whereby the stack is moved on past the sawing station 36, entraining the lugs 49 and 50 therewith.

Figure 3:
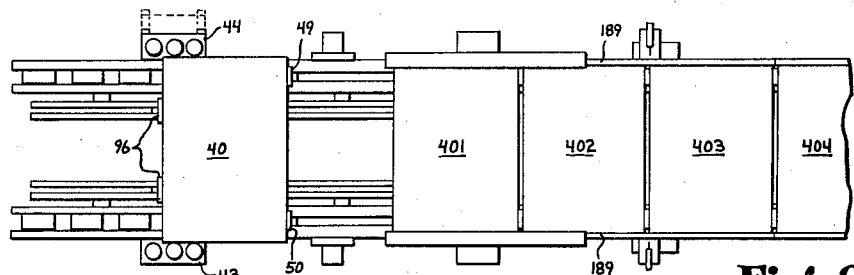

The pusher mechanisms are so proportioned that the stroke of the pushers 55 and 56 carries the stack 40 completely through the sawing station and into the taping station 37. In FIGS. 2 and 3, a previously-received stack 401 is shown in the position to which it was moved by the previous stroke of the pushers 55 and 56.

Figure 4:
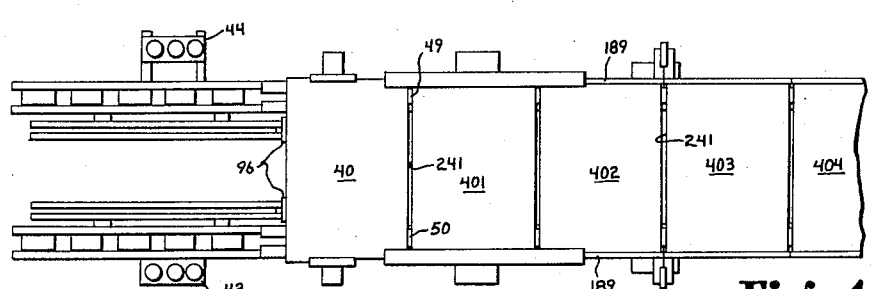

In FIG. 4, the stack 40 is shown in an intermediate position in which the spacer lugs 49 and 50 entrained with said stack have engaged the trailing edge of the stack 401 and have begun to move that stack toward the right. Other previously-received stacks 402, 403 and 404 are shown in their successive arrangements on the travel path to which they have been moved by successive cycles of the pusher mechanisms, each such cycle acting, through the stack currently engaged by the pushers 55 and 56, to move all of the previously-received stacks successively, step-by-step, along the travel path. As is clearly shown in FIGS. 2, 3 and 4, a pair of spacer lugs intervenes between each stack and its predecessor on the travel path to main uniform spacing, as at 241, between adjacent stacks.

At the taping station 37, a continuous strip of tape 189 is applied to each of the opposite ends of each stack. At the cutting station 38, cutter means is automatically actuated to sever each tape in registry with the spacing or separation 241. Beyond the cutting station, the stacks (such as 403 and 404 in FIG. 4) continue to move on the travel path as separate bundles, and they are ultimately discharged from the discharge end 39 of the machine to an off conveyor (not shown) or for manual handling.

Figure 6:
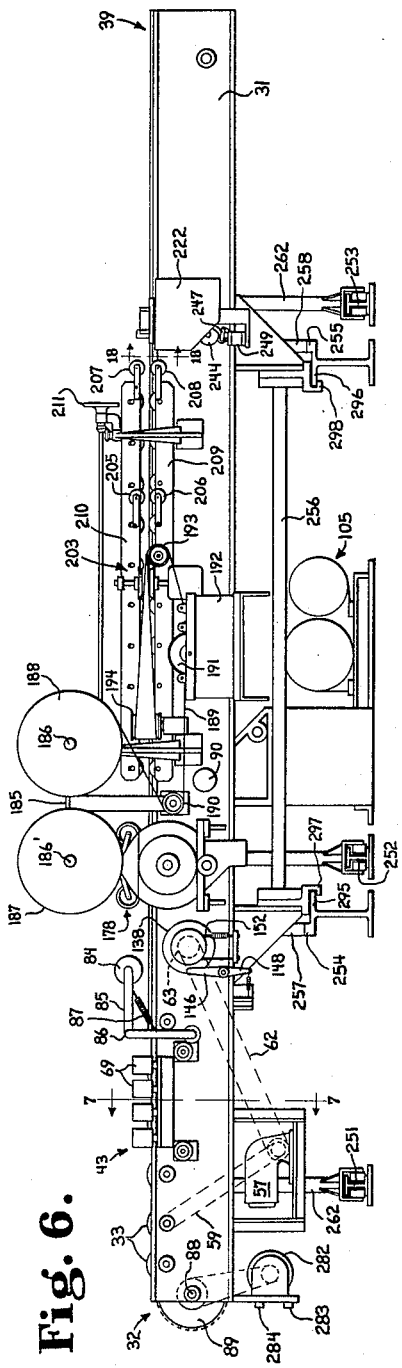
FIG. 6 (Sheet 3) is a side elevation, with parts broken away.
Figure 7:
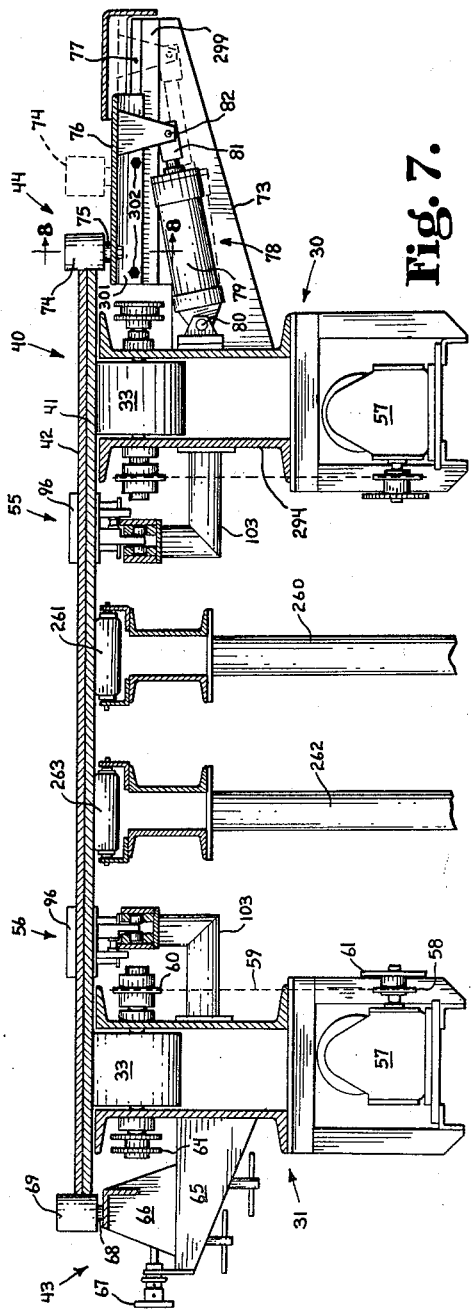
FIG. 7 (Sheet 3) is a transverse section, taken substantially on the line 7—7 of FIG. 6 and looking in the direction of the arrows; the figure being drawn to an enlarged scale.

Referring, now, to FIGS. 6 and 7, it will be seen that a prime mover 57 is suitably mounted on each frame assembly 30 and 31 and continuously drives a sprocket 58 which is drivingly connected, by a chain 59, to a sprocket 60 which, in turn, is drivingly connected to sprockets 64 on the shafts of the several pull rolls 33 of the corresponding frame assembly. Thus, the pull rolls 33 are all driven synchronously in a direction to move work pieces deposited thereon toward the right, in the manner above described. The several pull rolls are preferably mounted on their respective shafts through overrunning clutches so that, if work pieces are delivered thereto at excessive velocities, the rolls may temporarily overrun their shafts.

Each prime mover 57 also drives a sprocket 61 which is connected by a chain 62 to drive a sprocket 63 on a shaft 134 (FIGS. 9, 11, 12, 13 and 15), for a purpose later to be explained.

Figure 5A:
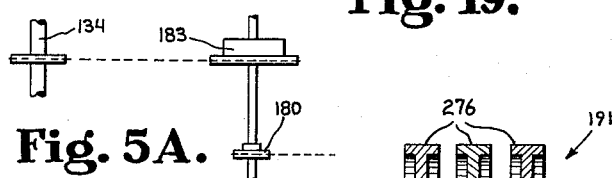
FIG. 5A (Sheet 8) is a fragmentary, somewhat diagrammatic plan view of drive means for the spacer lug carriages, forming a part of the present invention.

The end-justification unit 43 is mounted on a platform 65 and comprises a base 66 provided with a justifying means 67 whereby said base may be slightly adjusted laterally as viewed in FIG. 7. A series of spindles 68 is mounted in parallel relationship upon said base 66 and each spindle supports a roll 69 through suitable anti-friction bearing means. Each roll is preferably provided with a rubberoid facing, and the rolls are so arranged as to present, toward the work travel path, faces disposed in tangency to a common plane 70 (FIG. 5) parallel with said travel path.

Figure 8:
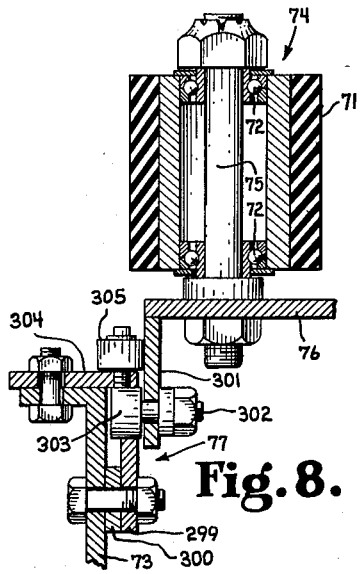
FIG. 8 (Sheet 4) is a further enlarged, fragmental section taken substantially on the lines 8—8 of FIG. 7.

The unit 44 comprises a similar series of similar rolls 74 similarly mounted through anti-friction bearing means 72 on spindles 75 and having rubberoid facings 71; but said spindles 75 are supported upon a carriage 76 mounted for lateral movement in a guideway 77. As shown, a bracket 73 fixed to an element of the frame assembly 30 supports a pair of rails 299, only one of which is shown in FIGS. 7 and 8, each such rail being spaced from the bracket wall by a spacer 300. A depending flange 301 at each side of the carriage 76 carries a plurality of axles 302, each supported by a wheel or roller 303 mounted to run on the upper edge of one of the rails 299. The bracket also supports a pair of hold-down plates 304 overlying said wheels; and rollers 305 are supported on vertical axes from said plates to guide the carriage 76 laterally.

A fluid motor indicated generally by the reference numeral 78 comprises a cylinder 79 one end of each is pivotally mounted at 80 on the frame 30, and a piston rod 81 which is pivotally connected at 82 to an element of the carriage 76. The motor 78 is so dominated by the switches 45, 46, 47 and 48 as to move the carriage 76 inwardly when the switches 45 and 46 are closed and to move said carriage outwardly when the switches 47 and 48 are closed, as above described.

Between the end-justification station 34 and the sawing station 35, I preferably provide hold-down rolls 83 and 84 (FIG. 5). As shown in FIG. 6, the roll 84 is carried on an arm 85 pivotally supported on a standard 86, the distal end of said arm being urged downwardly by a coiled spring 87. Except for the end-justification station 34, the apparatus at each side of the machine is the same at each station; and therefore only one side of the machine will be described in detail.

Figure 9:
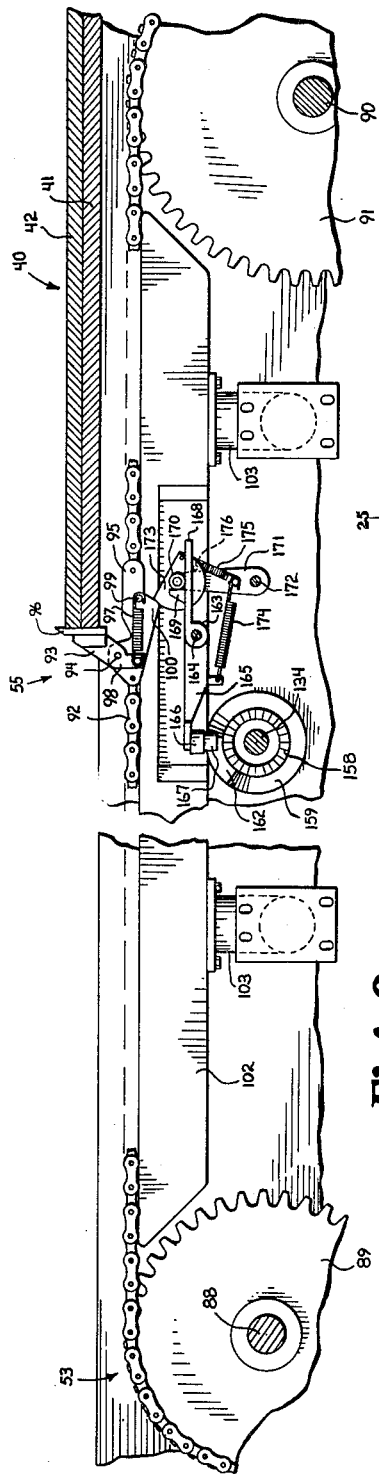
FIG. 9 (Sheet 5) is an enlarged, fragmental, longitudinal section illustrating the pusher mechanism which constitutes a feature of the present invention.
Figure 15:
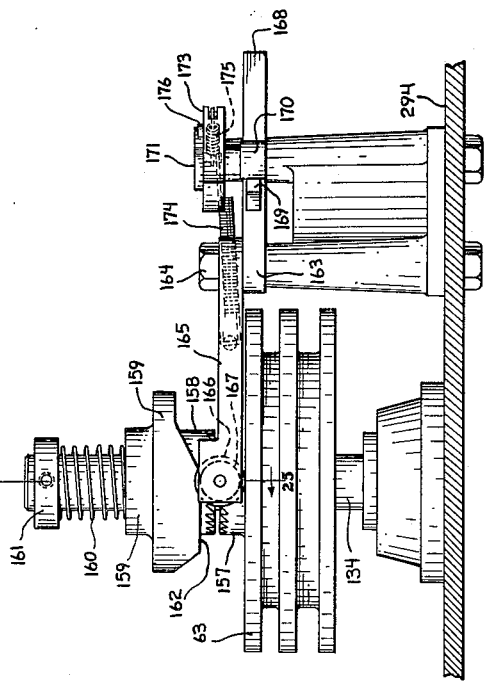
FIG. 15 (Sheet 5) is a fragmental plan view of a single revolution clutch mechanism for driving the spacer lug positioning means.

The pusher mechanism 53 is illustrated in detail in FIG. 9. A stub shaft 88 carries a sprocket 89 closely adjacent the receiving end of the work travel path; and a shaft 90, which spans the two frame assemblies at a point beyond the sawing station 36, has a sprocket 91 keyed thereto. An endless roller chain 92 is trained over the sprockets 89 and 91.

A lever 93 is pivoted at 94 on a special link 95 in the chain 92, and a pusher lug 96 is secured to the upper end of the lever 93. A spring 97 has one end connected to the lower arm 98 of the lever 93 and has its opposite end connected to an achorage 99 on the link 95, whereby said lever 93 is yieldably held in its illustrated position but may swing in a clockwise direction about its pivotal mounting 94. Thus it will be seen that, after the pusher 55 has completed the forward portion of its cycle and begins to move back to its starting position, the lug 96 will be swung to its down-folded position upon encountering a work piece entering the machine, to move beneath that work piece and to permit the work piece to be carried, by the rolls 33, to a position in which its trailing edge may be engaged by the pushers. In FIG. 2, I have indicated the lugs 96 in their folded-down positions beneath the pieces 41 and 42 as those pieces move toward the lugs 49 and 50.

Referring again to FIG. 9, it will be seen that the link 95 is formed with a depending toe 100 for a purpose later to be explained.

Figure 10:
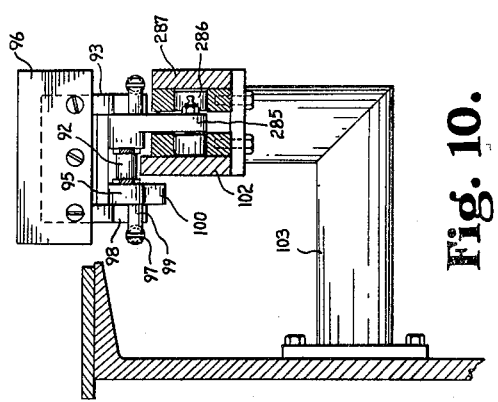
FIG. 10 (Sheet 5) is an enlarged, fragmental, transverse section taken substantially on the line 10—10 of FIG. 5 and looking in the direction of the arrows.

A support rail 102 is carried by brackets 103 and supports the upper run of the chain 92 between the sprockets 89 and 91. As is most clearly shown in FIG. 10, the link 95 is formed to provide a tail 285 which carries wheels or rollers 286 guided in a trackway 287 associated with the rail 102 to stiffen the action of the link 95.

Referring once more to FIG. 5, it will be seen that I have shown a main drive motor 104 connected, through a variable speed drive 105 and a reducer 106, to drive a sprocket 107. The sprocket 107 is drivingly connected to a sprocket 108 fixed to a shaft 109, whereby said shaft 109 is continuously, unidirectionally driven. A gear 110 is loosely mounted on the shaft 109 and meshes with a gear 111 fast on the shaft 90. A fluid actuated clutch 112 is arranged selectively to provide a driving connection between the shaft 109 and the gear 110. A sprocket 113 is loosely mounted on the shaft 109 and is chain-connected to a sprocket 114 fast on the shaft 90. A second fluid actuated clutch 115 is arranged on the shaft 109 selectively to establish a driving connection between the shaft 109 and the sprocket 113.

Thus, it will be seen that, when the clutch 112 establishes a driving connection between the shaft 109 and the gear 110, the shaft 90 will be driven in a direction to drive the upper run of the chain 92 toward the right as viewed in in FIG. 9; and when the clutch 115 establishes a driving connection between the shaft 109 and the sprocket 113, the shaft 90 will be driven in the opposite direction to move the upper run of the chain 92 toward the left as viewed in FIG. 9.

The switches 51 and 52 (FIG. 1) dominate the clutch 112 so that, when said switches 51 and 52 are closed as above explained, the clutch 112 will establish a driving connection between the shaft 109 and the gear 110. A cam wheel 282 (FIG. 6) is chain driven with the shaft 88 and coacts with a switch 283 to disengage the clutch 112 when the pushers 55 and 56 reach the right hand end of their stroke and to engage the clutch 115. Thereby, the shaft 90 is driven in the opposite direction to return the pushers 55 and 56 to their starting positions. A switch 284 is actuated by the cam wheel 282 when the pushers attain their starting positions to disengage the clutch 115 and to set a brake (not shown) on the shaft 90. The pushers 55 and 56 will now remain in their starting positions until such time as a newly-introduced work piece engages the switches 51 and 52 as above explained.

Each frame assembly 30 and 31 is constructed to provide a closed, orbital trackway indicated generally by the reference numeral 116 (FIGS. 5, 11 and 12). Each such trackway comprises an advancing run 117 which closely parallels the work travel path, a return run 118 significantly spaced from that travel path, a discharge end section 119 connecting the discharge end 120 of the advancing run with one end 121 of the return run, and a receiving end section 122 which connects the other end 123 of the return run with the receiving end 124 of the advancing run. The spacer lug 49 constitutes an element of a carriage 125; and whenever the carriage 125 is disposed in the adavncing run 117 of the trackway 116, the lug 49 will be disposed in the path of movement of work pieces on the work travel path.

Figure 14:
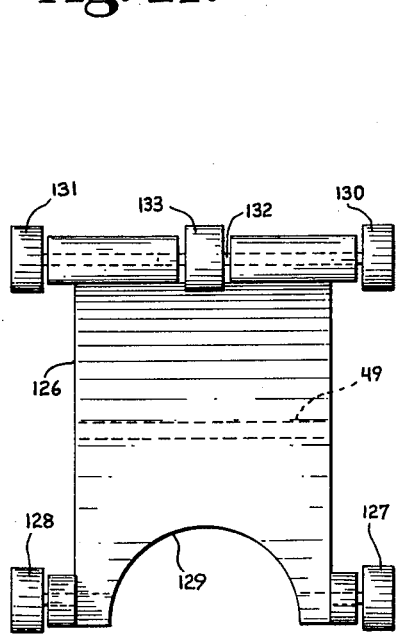
FIG. 14 (Sheet 4) is an enlarged bottom plan view of a spacer carriage.

The carriage 125 comprises a body 126 (FIG. 14) supported upon leading wheels 127 and 128 and trailing wheels 130 and 131. The carriage body is preferably cut away at 129 between the wheels 127 and 128 and is arched from end to end in the manner most clearly illustrated in FIGS. 11 and 13. The wheels 130 and 131 support an axle 132 which, substantially at its mid-point, loosely carries a roller 133. A suitable plurality of other carriages, identical with the carriage 125, is arranged for free, individual travel throughout the trackway 116. In FIG. 11, I have shown six such additional carriages at 1251, 1252, 1253, 1254, 1255 and 1256. It is particularly to be noted that each of these carriages is movable within the trackway with complete independence relative to the other carriages and that each such carriage includes a spacer lug like the lug 49.

A shaft 134 is journalled in the frame assembly 30 at a point within the stroke of the pusher mechanisms 53 and 54 and between the end-justification station 34 and the sawing station 36; and a similar shaft is journalled in the frame assembly 31 in axial alignment with the shaft 134. As is most clearly to be seen in FIG. 5, the shaft shaft 134 spans the frame assembly and the pusher mechanism 53.

A rotor 135 (FIGS. 11, 12 and 13) is fixed to the shaft 134. The shaft 134 is concentric with the end section 122 of the trackway 116, and the rotor is so proportioned and designed that its periphery sweeps said trackway end section 122. At one point in its periphery, the rotor 135 is formed with a notch 136 defining a radially-elongated shoulder 137. The parts are so proportioned and designed that the notch 136 will receive and retain the roller 133 of a carriage whose rear axle 132 is positioned in the trackway section 122; and plates 291 overlie the wheels 130 and 131, to retain said roller against removal from the notch 136 when the rotor position is such that said notch is vertically above the axis of shaft 134.

A retainer wheel 138 is likewise fixed to the shaft 134 and is formed with a deep notch 139 (FIG. 13) and with a shallow notch 140. A segment plate 141 has one end pivotally secured as at 142 to an element of the frame and is formed near its opposite end with an arcuate slot 143 through which penetrates a clamp screw 144. Thus the plate 141 is mounted for limited adjustment about its pivotal axis 142 and may be solidly clamped in any selected position of such adjustment.

The plate 141 carries a pivot 145 for a lever, the upper arm 146 of which carries a roller 147 at its distal end. The plate 141 is so adjustably positioned that, when the roller 147 registers with the deep notch 139 in the retainer wheel 138, the notch 136 in the rotor 135 will be located vertically above the axis of the shaft 134. The lower lever arm 148 is yieldably urged in a clockwise direction by a spring 149 one end of which is anchored on said lever arm 148 and the other end of which is attached to an anchorage pin 150 on a plate 151 adjustably mounted for movement toward and away from the vertical plane including the axis of the pivot 145. Thus, engagement of the roller 147 in the notch 139 yieldably restrains the shaft 134 and the rotor 135 against rotation from their illustrated positions, and the degree of such restraint is adjustably dependent upon the current position of the adjustable plate 151.

In practice, the plate 151 will be adjusted so that the engagement of the roller 147 in the notch 139 will restrain the rotor 135 against a force of approximately fifty pounds applied against the lug 49, but will yield upon the application of a slightly greater force. Thus, the lugs 49 and 50 will be held in the positions of FIGS. 1, 11 and 13 with a restraining force sufficient to ensure justification of the leading and trailing ends of the pieces 41 and 42 of a stack 40; but when the restraining effect of the rollers 147 is overcome, the lugs 49 and 50 and their carriages 125 will be forced to the right, thus turning the rotor 135 and shaft 134, as well as the retainer wheel 138, in a clockwise direction until the mouth of the notch 136 enters the receiving end 124 of the advancing run 117 of the trackway 116, whereupon the roller 133 will be released from the notch 136 and the carriage 125 will be free to travel, under the influence of the pushers 55 and 56, along the trackway run 117, forcing the stack 40 to move ahead of them along the work travel path.

As the retainer wheel 138 thus turns, the roller 147 will be cammed out of the notch 139, against the tendency of the spring 149, and will ride the periphery of the wheel 138 until, substantially simultaneously with release of the carriage 125, said roller drops into the shallow notch 140, whereby rotation of the shaft 134 will again be stopped. Preferably, a brake band 152, having one end affixed to an adjustable anchorage 153, is wrapped about a brake drum 154 on the shaft 134 and has its opposite end attached to one end of a spring 155 whose other end is anchored at 156. Thus, overrun of the shaft 134 is further inhibited.

Figure 25:
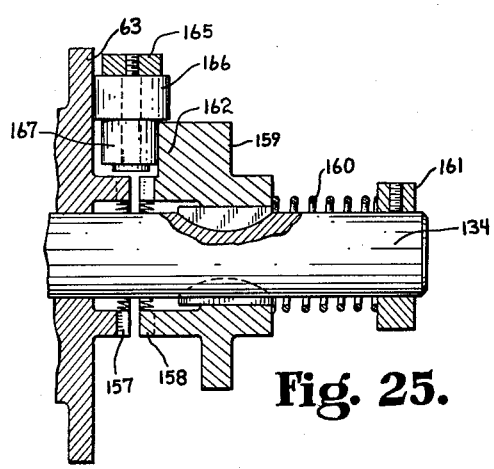
FIG. 25 (Sheet 4) is an enlarged, fragmental section taken substantially on the line 25—25 of FIG. 15.

One element 157 of a jaw clutch (FIGS. 15 and 25) is fixed to turn with the sprocket 63 and faces a mating clutch element 158 keyed to the shaft 134. The clutch element 158 comprises a disc 159 yieldably urged toward engagement with the element 157 by a spring 160 sleeved on the shaft 134 and confined between said element 158 and an abutment disc 161; and said disc 159 is formed, at a suitable point, with an axially-offset land 162 having a peripheral extent of about 45° and merging with the disc face through inclined surfaces at its opposite ends.

A lever 163 is pivoted at 164 upon an element 294 of the frame assembly; and one arm 165 of said lever carries a roller 166 bearing against a face of the sprocket 63. Said lever arm further carries a second, somewhat smaller roller 167 proportioned and arranged to bear upon the adjacent face of the disc 159 in the turning pathway of the land 162. When the land 162 is engaged with the roller 167, the clutch element 158 is held out of cooperative engagement with the clutch element 157. The other arm 168 of the lever 163 carries a stop 169 adapted for engagement by a roller 170 which is supported at the distal end of a lever 171 pivotally mounted at 172, said roller overlying the lever arm 168. The distal end of the lever 171 also carries a cam block 173. A spring 174 yieldably urges the lever 171 in a counter-clockwise direction and a spring 175 yieldably urges the cam 173 in a clockwise direction. A stop pin 176 on the cam 173 is normally held, by the spring 175, in engagement with one edge of the lever 171.

With the parts in their positions illustrated in FIG. 9, the cam 173 is positioned for engagement by the toe 100 of the link 95 as the upper run of the chain 92 moves toward the right. Upon such engagement, the link 95 entrains the cam 173 to swing the lever 171 in a clockwise direction. Such movement of the lever 171 obviously depresses the arm 168 of the lever 163 to lift the roller 167 substantially radially out of contact with the land 162, thus permitting the spring 160 to move the clutch element 158 into meshing engagement with the clutch element 157. Since the sprocket 63 is continuously rotating, such engagement will cause the shaft 134 to be driven in a clockwise direction as viewed in FIGS. 9 and 11. As the disc 159 begins to turns, the land 162 will be moved out of registry with the normal position of the roller 167 so that, when the lever 163 is permitted to return to its illustrated position, the land 162 will not interfere with the roller until the shaft 134 has substantially completed one revolution.

It will be seen that, after the lever 171 has been moved through approximately 20° in a clockwise direction, the link toe 100 will override and release the cam 173, whereupon the spring 174 will return the lever 171 until the roller 170 engages the stop 169. As said lever is so returned, it permits spring 174 to return lever 163 to its illustrated position, thus locating roller 167 in the path of land 162; and as shaft 134 substantially completes one revolution, the inclined surface at the leading end of said land will engage the roller 167 to cause the clutch element 158 to be retracted to the position illustrated in FIG. 15. At this time, the rotor 135 will have been returned to the position of FIGS. 11, 12 and 13. On the return stroke of the link 95, engagement of the toe 100 with the cam 173 will merely rotate the cam about its own axis in a counterclockwise direction, against the tendency of the spring 175, without affecting the lever 171.

A sprocket 179 (FIG. 11) is mounted within the orbit of the track 116 near the discharge end thereof and a companion sprocket 180 is similarly mounted near the opposite end of the trackway. An endless chain 181 is trained over the sprockets 179 and 180 and carries a series of outwardly projecting lugs 182. Drive means including a slipping clutch 183 (FIG. 5A) connects shaft 134 to drive the sprocket 180. As spacer lug carriages reach the discharge end of the trackway run 117, they enter the discharge end section 119 of said trackway and will move by gravity through said end section to the position of the carriage 125a in FIG. 11. The chain 181 is so arranged that its lugs 182 will engage the rollers 133 of carriages disposed in the trackway run 118 to urge those carriages toward the receiving end of the machine. Thus it will be seen that, in FIG. 11, the carriage 1255 is engaged by a lug on the chain 181 but is held against further movement toward the left by its engagement with the carriage 1256 whose trailing axle is so located that, as the rotor 135 turns through a clockwise rotation, the roller 133 of the carriage 1256 will be engaged by the shoulder 137 and, as the rotor continues its revolution, said carriage 1256 will be propelled into the position which, in FIG. 11, is occupied by the carriage 125. With the parts in their illustrated positions, the carriage 1256 is held against further progress into the trackway section 122 under the influence of the chain 181 by engagement with the periphery of the rotor 135 with the roller 133 of said carriage 1256. However, as soon as the carriage 1256 is entrained by the shoulder 137, and is moved out of its illustrated position, the carriage 1255 will be freed for movement into the position occupied by the carriage 1256 in FIG. 11. As soon as the carriage 1255 is so freed, the friction drive for sprocket 180 will act upon the chain 181 to move it far enough to carry the carriage 1254 to the position occupied by the carriage 1255 in FIG. 11, thus forcing the carriage 1255 into position to be picked up by the next revolution of the rotor 135. Meantime, the other carriages in the trackway run 118 will be advanced toward the receiving end of the machine. Thus, the illustrated mechanism will always maintain one carriage in position to be entrained by the notch 136 and will progressively move additional carriages toward that position.

It will thus be seen that, when one pair of spacer lugs is disengaged from the positioning means to travel with a stack of work pieces, mechanism is thereby set in motion to bring another pair of spaced lugs immediately into position to be engaged by, and to travel with, the next stack of work pieces.

As each stack moves from the position of stack 40 in FIG. 3 to the position of the stack 401 in that figure, it passes a pair of saws 177 (FIGS. 5 and 11) arranged adjacent the lateral boundaries of the work travel path, whereby the opposite ends of the work pieces are evenly trimmed. Hold-down means 178 (FIG. 11) spans each saw position to prevent upward movement of the boards, and the saws are so constructed and arranged that the teeth are moving downwardly as they engage the work.

Adjacent the receiving end of the taping station 37 and at each side of the machine, I provide a stand 185 (FIGS. 5 and 6) supporting a spindle 186 and a spindle 186'. An inactive or spare roll of bundler tape 187 is supported on the spindle 186' and an active roll 188 of such tape is supported on the spindle 186. A continuous strand of tape 189 leads from the supply roll 188 and is threaded around an idler roll 190 (FIGS. 5, 6 and 17), thence over a glue applicator roll 191 of a glue pot 192 later to be described, and thence around an idler 193. From the idler 193, the tape is twisted through 90° and passes around a first guide roll 194 and a second guide roll 195 (FIGS. 5 and 17). From the guide roll 195, the tape is threaded through a conventional folder 196 in which it is formed to C-shape with upper and lower legs 189A and 189B (FIGS. 18 and 21) so spaced as to overlie the upper surface of the piece 42 and underlie the lower surface of the piece 41, respectively.

Figure 19:
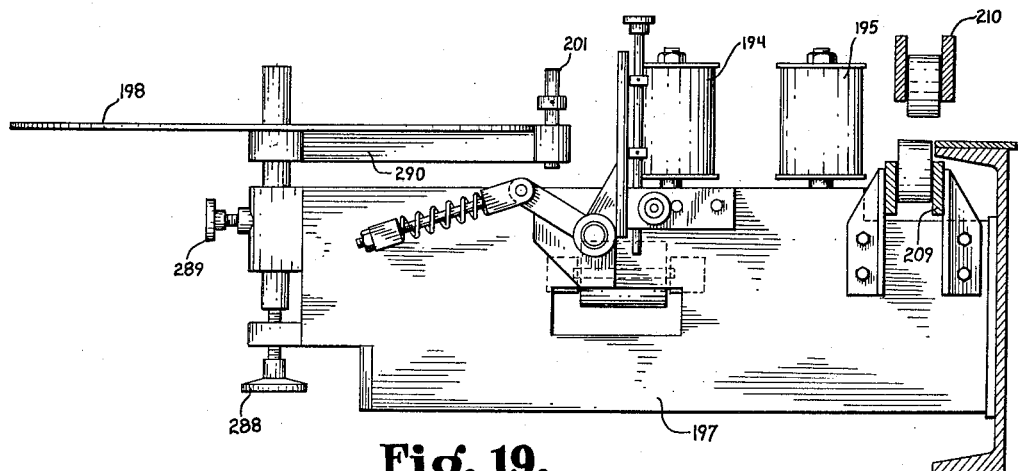
FIG. 19 (Sheet 8) is a fragmental transverse section, drawn to an enlarged scale and taken substantially on the line 19—19 of FIG. 16.

A bracket 197 (FIGS. 5 and 19) supports at its distal end a table 198 upon which is carried a supply roll 199 of tear tape. A continuous strip of tear tape 200 is led from the supply roll past a guide post 201 and thence into contact with the glue-coated surface of the bundler tape 189 as the two strands of tape pass the first guide roll 194. Preferably, and in the particular operation herein illustrated and described, the bundler tape 189 is approximately 2½" wide and approximately the thickness of bond correspondence paper. The tear tape 200 is somewhat heavier and is approximately ½" wide. As is most clearly illustrated in FIG. 19, the spindle of the table 198 is adjustably supported from the bracket 197 by means of an adjuster screw 288 and a set screw 289, so that the tear tape strand may be laid against the glue-coated face of the bundler tape strand substantially midway between the edges of the latter. The guide post 201 may preferably be carried at the distal end of a leaf spring 290, whereby a substantially constant tension is maintained on the advancing tear tape strand 200.

The tear tape strand, of course, will adhere to the glue-coated surface of the bundler tape strand as the two strands move through the folder 196. As they emerge from the folder, the tapes are pressed against the adjacent ends of the work pieces 41 and 42 by a first leaf spring presser 202 (FIGS. 5, 16 and 17). Then the legs 189A and 189B of the bundler tape are engaged by a creaser mechanism indicated generally at 203 (FIGS. 16, 17 and 21), whereby said tape legs are pressed firmly against the opposite faces of the stack; and then the tapes are again engaged by a second presser spring 204. Thereafter, the tape legs are respectively engaged by a first upper presser roller 205 and a first lower presser roller 206 (FIGS. 16 and 17). Just before the work emerges from the taping station, the bundler tape legs are again engaged by a second set of presser rollers 207 and 208. It will be noted (FIG. 17) that the presser rollers are canted so that they tend to draw the tape legs toward the center of the machine, thus tightening the tapes against the boards. Throughout the taping operation, the boards of a stack are pressed toward each other by a bottom press roll unit 209 which is stationary and a top press roll unit 210 which is adjustable toward and away from the bottom unit 209 by means of an adjusting wheel 211. Additionally, the rolls of the top roll unit are mounted for slight vertical movement relative to the roll unit frame and are individually spring pressed downwardly.

Figure 21:
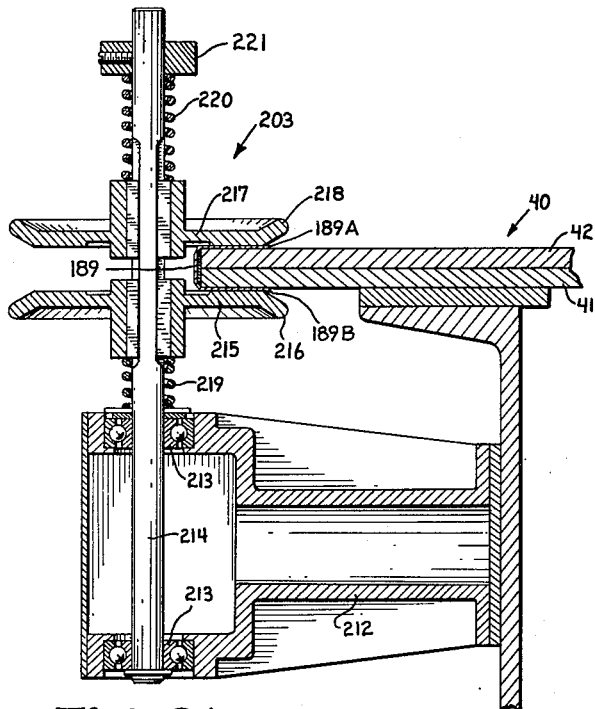
FIG. 21 (Sheet 4) is an enlarged transverse, fragmental section taken substantially on the line 21—21 of FIG. 17 and looking in the direction of the arrows.

The creaser unit 203 is illustrated in further detail in FIG. 21. A bracket 212 is supported from each frame assembly and mounts anti-friction bearings 213 in which a spindle 214 is supported. Keyed to the spindle is a first creaser wheel 215 having a flaring peripheral region 216. Suitably spaced above the wheel 215 is a second, allochirally arranged wheel 217 having a flaring periphery 218. A spring 219 is confined between the hub of the wheel 215 and the upper bearing 213 and a spring 220 is confined between the hub of the wheel 217 and an abutment 221. Obviously, the springs 219 and 220 press the wheels 215 and 217 toward each other so that, as the taped bundle moves between the wheels, said wheels tightly press the legs 189A and 189B of the bundler tape against the opposite faces of the work pieces 41 and 42.

As the work emerges from the taping station, it comes into cooperative association with the cutting station 38. Each cutting station (see FIGS. 5, 22, 23 and 24) comprises a table 222 beneath which is journalled a rock shaft 223 one end of which extends into the associated frame assembly and carries, in registry with the work travel path, an actuator lever 224 (FIGS. 11 and 22). As is most clearly to be seen in FIG. 11, the distal end 225 of the lever 224 is hooked and is disposed in the advancing path of the rollers 133 of the spacer carriages.

A lever 226 (FIG. 23) is fixed to the rock shaft 223 and one arm 227 thereof terminates in a yoke 228. The effective length of the lever arm 227 is identical with the effective length of the lever 224.

The table 222 provides a trackway paralleling the work travel path and comprising hold-down rails 229 and 230 for guiding and retaining the wheels 231 of a cutter carriage 232. As is most clearly to be seen in FIGS. 23 and 24, said carriage 232 is mounted for reciprocating travel in a line parallel to the direction of movement of work through the machine. Near its leftward end, said carriage is formed with a longitudinally-extending, median slot 234 in which is carried a roller 235; and the yoke 228 of the lever arm 227 extends into said slot and operatively straddles the roller 235. It will be apparent from the structure thus described that rocking movement of the lever 224 will result in travel of the carriage 232 along the table 222 in exact synchronism with travel of a spacer carriage whose roller 133 is currently in engagement with the hooked end 225 of the lever 224.

A fluid motor cylinder 236 is mounted on the carriage 232 upon an axis transverse to the direction of movement of work through the machine; and the piston of said motor carries a head 237 to which is secured a cutter blade 238. Guide means for the cutter blade is illustrated at 239. Preferably, the carriage 232 will be provided with additional wheels 240, mounted on vertical axes, for more accurately guiding said carriage in its movements.

The lower arm 242 of the lever 226 is resiliently urged in a counter-clockwise direction by means of a coiled spring 243. At its distal end, said lever arm 242 carries a cam block 244 which is yieldably urged in a counter-clockwise direction relative to said lever arm by a spring 245. The cam 244 is thus suspended in cooperative relation to a roller 246 on the end of an actuator arm 247 which cooperatively engages the plunger 248 of a valve 249 which dominates the supply of fluid under pressure to the opposite ends of the motor cylinder 236 through flexible hoses 292. The construction and arrangement is such that, when the plunger 248 is depressed, the fluid motor will be actuated to advance the cutter blade 238 into the space 241 between an adjacent pair of bundles such as, for instance, 402 and 403, to sever the adjacent tape; and when the plunger 248 is released, the fluid motor will be energized to retract the cutter blade. Obviously, as the lever 226 is moved in a clockwise direction from its position illustrated in FIG. 23, the cam 244 will act upon the roller 246 to depress the plunger 248. After a short movement in a clockwise direction, the cam 244 will override the roller 246 to permit the plunger 248 to return to its illustrated position. As the lever 226 returns to its illustrated position, engagement of the cam 244 with the roller 246 will cause the cam to be turned in a clockwise direction about its pivotal mounting 250, against the tendency of the spring 245, so that the parts may return to their illustrated positions without affecting the plunger 248.

As was stated earlier, the machine of the present disclosure is adapted to handle boards in lengths anywhere within the range between 6′ and 16′. As shown, the frame assembly 30 is stationarily mounted, and the frame assembly 31 is mounted for movement toward and away from the frame assembly 30. Base trackways 295 and 296 (FIGS. 5, 6 and 22) extend transversely of the direction of movement of work through the machine, and they carry racks 254 and 255 and are paralleled by other trackways 251, 252 and 253. Shoes 297 and 298 supportingly secured to the frame assembly 31, are slidably mounted upon the trackways 295 and 296, respectively. A shaft 256 (FIGS. 6 and 22) carries pinions 257 and 258 meshing respectively with the racks 254 and 255, and said shaft is suitably journalled in the frame assembly 31. A reversible motor 259 is chain-connected to drive the shaft 256. Obviously, by operation of the motor 259 in one direction or the other, the frame assembly 31 will be caused to traverse the trackways 295 and 296 in one direction or the other, whereby the spacing between the frame assemblies 30 and 31 may be varied as desired.

Auxiliary frames 260 and 262 support series of idler rolls 261 and 263 to carry the intermediate sections of work pieces as they progress through the machine. The auxiliary frame 260 is mounted on carriages 264 movable in the trackways 251, 252 and 253, and the auxiliary frame 262 is similarly mounted upon carriages 265. Thus, depending upon the selected spacing between the frame assemblies 30 and 31, the auxiliary frames 260 and 262 may be suitably located in intermediate positions to sustain the work against sagging as it moves through the machine.

Figure 20:
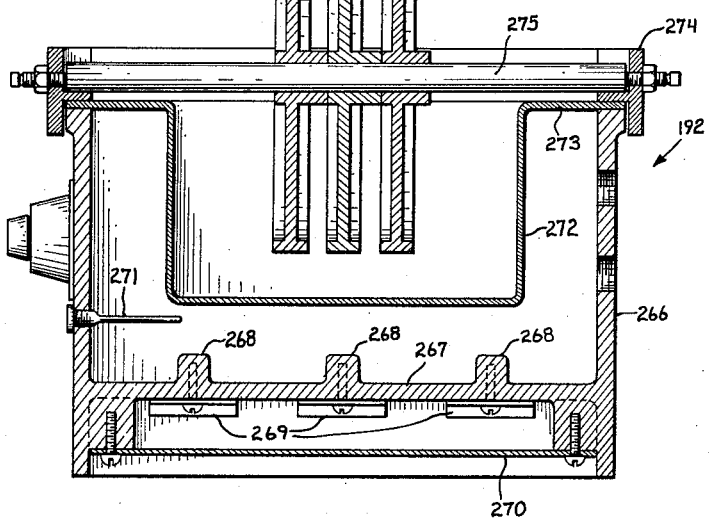
FIG. 20 (Sheet 8) is an enlarged section taken substantially on the line 20—20 of FIG. 17.

The glue pot, somewhat casually referred to above, is illustrated in further detail in FIGS. 17 and 20. Preferably, a cast iron water jacket 266 has its floor 267 formed with upstanding ribs 268, and strip heaters 269 are secured to the floor 267 preferably in registry with said ribs. A closure plate 270 encloses the strips 269; and a thermostat 271 is suitably mounted to project into the body of water with which the jacket is filled, said thermostat being suitably connected to dominate the heater strips 269 in accordance with the current temperature of water in the jacket. A preferably aluminum pot 272 is formed to provide a perimetral flange 273 adapted to hang from the rim of the jacket 266 whereby the body of the pot will be immersed in the water within the jacket 266.

A frame 274 is adapted to rest upon the flange 273 and is formed to support a spindle 275 upon which the applicator wheel 191 is mounted. In the form illustrated, said applicator comprises three separate wheels 276 which act to apply separate stripes of glue to the bundler tape 189, at the opposite edges of the tape and in the median region of the tape. Additionally, the frame preferably mounts a series of parallel tape-guiding rods 277, 278 and 279 which act to hold the tape down upon the glue-bearing surface of the applicator 191. Still further, the rod 277 may carry laterally adjustable guide elements 280; and a spreader or scraper 281 is preferably disposed between the rods 278 and 279 to limit the thickness of the glue coating on the tape.

*Operation*

Assuming the machine to be empty, the motor 259 (FIG. 22) will be manually energized to locate the frame assembly 31 in desired relation to the frame assembly 30, and the auxiliary frames 260 and 262 will be symmetrically positioned between the frame assemblies 30 and 31. Now, the main drive motor 104 (FIG. 5) will be energized and the individual motors for the saws 177 will be started. Suitable means is provided for preventing actuation of the clutch 112 unless the saws are running. Now, the motors 57 (FIGS. 6 and 7) are started and it will be understood, of course, that the heaters for the glue pots have brought the glue to suitable temperatures.

A stack 404 of boards is now introduced to the entrance end 32 of the machine and into supported relation on the pull rolls 33. As those rolls move the boards toward the right (FIG. 2) the lower board (such as 41) will engage the switches 45 and 46 to actuate the fluid motor 78 (FIG. 7) to move the evener unit 44 downwardly as viewed in FIGS. 2 and 3. The rolls 74 (FIG. 5) of the unit 44 will engage the adjacent ends of the boards in the stack to press the remote ends of those boards against the rollers 69, thus justifying the ends of the two boards as they are carried, by the pull rolls 33, past the units 43 and 44. When the leading edge of the stack engages the switches 47 and 48, the unit 44 will be withdrawn.

It will be appreciated that, as the boards entered the machine, they engaged the pushers 55 and 56 to fold the lugs 96 thereof (FIG. 9) forwardly and downwardly to the positions suggested in FIG. 2. As the trailing edges of the boards move past those lugs, the springs 97 will return the levers 93 to their upright positions as illustrated in FIG. 9.

Carriages 125 (FIG. 11) are held in the notches 136 with their spacer lugs 49 and 50 in the advancing path of the leading edges of the boards. As the lower board engages the switches 51 and 52, the clutch 112 is engaged and the pusher mechanisms 53 and 54 will be actuated to move the lugs 96 toward the right and into engagement with the trailing edges of the boards. The rate of advancement of the pushers 55 and 56 will be at least equal to, and may exceed, the rate at which the boards are moved by the pull rolls 33. The lugs 96 will engage the trailing edges of the boards and will move their leading edges into abutment with the spacer lugs 49, 50. As explained above, those lugs are held against movement toward the right by the engagement of the roller 147 (FIG. 13) in the notch 139, with a degree of resistance which is dependent upon the setting of the plate 151. As the lugs resist advancing movement of the boards, any inequality or lack of registry between the leading and trailing edges of the respective boards will be justified.

After such justification, the continuing advancement of the lugs 96 will overcome the resistance of the rollers 147 and the rotors 135 will be turned to release the carriages 125 for travel along the advancing run 117 of the trackways 116; and the stack 404 will be pushed past the saws 177 which will trim the lateral ends of the boards to precise dimensions.

As the toes 100 of the links 95 (FIG. 9) engage the cams 173 to actuate the levers 163, the clutch elements 158 (FIG. 15) will be moved into engagement with the clutch elements 157 to drive the shafts 134, thereby turning the rotors 135 to complete one revolution thereof. During that revolution, each rotor 135 will pick up the carriage 125S (FIG. 11) and carry it to a position in which its lug is ready for engagement by the leading edge of the next stack of boards (such as 403) to be fed to the machine.

As the pushers 55 and 56 reach the right hand end of their stroke, the cam wheel 282 (FIG. 6) will actuate the switch 283 to disengage the clutch 112 and engage the clutch 115 (FIG. 5) whereby the pushers 55 and 56 will be returned to their starting positions, whereupon the clutch 115 will be disengaged by the actuation of the switch 284 by the cam wheel 282. The stack 404 will thus be left standing on the travel pathway with its trailing edge slightly to the right of the sawing station 36 and with its leading edge about half-way through the taping station 37.

At this time, the tapes 189 and 200 (FIGS. 5, 6, 16, 17 and 18) may be threaded through the folder 196 and into engagement with the lateral ends of the stack 404.

If a new stack of work pieces is fed to the machine before the pushers 55 and 56 have returned to their starting position, the lugs 96 will be folded forwardly and downwardly as they pass beneath the boards of the new stack; and they will return to upright position as they clear the trailing edges of the new stack.

Now, the above operative cycle will be repeated as a new stack 403 moves into the machine; but this time, as the new stack moves past the saws, its leading edge will push the spacer lugs of the carriages 125S into engagement with the trailing edge of the first stack 404 and, as the stroke of the pusher mechanisms is completed, the stack 404 will be moved through the taping station to a point at which its leading edge will be almost in registry with the cutting station 38. As it moves through the taping station, tapes will be applied, in the manner above described, to the lateral ends of the stack 404.

Upon the next cycle of the pusher mechanisms, the stack 404 will be moved until the space 241 between the stack 404 and the stack 403 is almost in registry with the cutting station; and as the next succeeding cycle of the pusher mechanisms begins, the roller 133 of each carriage 125S behind the stack 404 will engage the hooks 225 (FIGS. 11 and 22) of the levers 224 to actuate the cutting devices in the manner above described to sever the tapes between the stack 404 and the stack 403. At the end of that cycle, the stacks 401, 402, 403 and 404 will be left standing in the positions which they occupy in FIG. 3. The next cycle of the pusher mechanisms will discharge the bundle 404 from the machine and will push the carriages 125S into the end sections 119 of the orbital trackways. The carriage 125S will thus come within the region of influence of the lugs 182 on the chain 181 to be moved toward the entrance end of the machine.

It will thus be seen that the cycle of operation of the pusher mechanisms 53 and 54 will be initiated whenever, but only when, a new stack of boards is introduced into the machine. It will also be apparent that the taping mechanism is operative to apply tapes continuously to the stacks as they move therepast, and that uniform separations are maintained between adjacent stacks throughout the taping, cutting and discharge phases of the machine cycle. Furthermore, because of the fact that the reciprocating pusher mechanisms 53 and 54 constitute the sole propelling means for moving work through the machine, and since those mechanisms are so designed that the right hand limit of the stroke of the lugs 96 is always at the same fixed point, each progressive step of the succession of stacks on the travel path always has a length precisely equal to the dimension of the work pieces measured in the direction of work travel. Thus no matter what board width is currently being handled by the machine, each advancing step of the succession of stacks will be precisely equal to that board width, whereby a separation 241 between adjacent stacks will always register accurately with the knives or cutters at the taping station, and no adjustment of the machine is required in order to obtain that objective when changing from one size of board to another. The arrangement whereby the separator carriages between adjacent stacks activate the propelling motors for the cutters also contributes to the attainment of this objective.

It will be apparent that, as the stacks move through the taping station, the boards of each stack are held firmly together over their whole areas by the press roll units 209 and 210 which will be suitably adjusted for board thickness and stack height.

Suitable safety mechanism may be provided in accordance with conventional practice for stopping the machine in case of malfunction of any of the automatic controls; and switch and/or valve means may also be provided for manually controlling any one of the normally-automatic operations of the machine.

I claim as my invention:

1. In a bundler, frame means providing a travel path for successive stacks of pieces, said travel path extending from a work entrance end to a work discharge end, reciprocable pusher means arranged adjacent the entrance end of said travel path, means for driving said pusher means through a limited stroke toward the discharge end of said travel path to advance a stack of pieces supported on said travel path and engaged by said pusher means, and for returning said pusher means, evener means positioned adjacent the lateral boundaries of said travel path within the range of said pusher means stroke, means for yieldably reducing the distance between the respective evener means during transit of said pusher means to justify the lateral ends of the pieces in a stack moving therepast, stop means, means releasably holding said stop means in position to be engaged by the leading edge of a stack of pieces travelling on said path under the influence of said pusher means before said pusher means reaches the limit of its advancing stroke, to justify the edges of said pieces, said holding means being constructed and arranged to release said stop means for free travel toward the discharge end of said travel path after such justification, cutter means positioned adjacent a lateral boundary of said travel path within the range of said pusher means stroke to trim a lateral end of the pieces in a stack moving therepast, means for moving a new stop means into releasably held position to be engaged by the leading edge of a further stack of pieces after said first-named stack has moved past said cutter means, taper means positioned adjacent each lateral boundary of said travel path, beyond the limit of the advancing stroke of said pusher means, each such taper means being constructed and arranged to apply to the adjacent ends of stacks of pieces moving therepast a continuous strip of adherent tape extending from the topmost surface of the stack, past said adjacent ends and onto the lowermost surface of the stack to bind said pieces into a coherent bundle, and means positioned adjacent each lateral boundary of said travel path beyond said taper means and operable to sever the adjacent tape strip at points between successive bundles on said travel path.

2. In a bundler, base means, a first side frame mounted on said base means, a second side frame mounted on said base means, each side frame providing a slideway for supporting one end of each of a series of work pieces spanning said slideways, work advancing means associated with each side frame, means for driving said respective work advancing means synchronously, a series of pairs of work-performing units, one unit of each pair being supported from each side frame, and means for shifting one side frame and its associated parts relative to said base means toward and away from the other side frame.

3. In a bundler, base means, a first side frame mounted on said base means, a second side frame mounted on said base means, each side frame providing a slideway for supporting one end of each of a series of work pieces spanning said slideways, work advancing means associated with each side frame, means for driving said respective work advancing means synchronously, a series of pairs of work-performing units, one unit of each pair being supported from each side frame, said base means being formed to provide a plurality of guides arranged transversely relative to said slideways and one of said side frames being mounted for movement along said guides, said base further providing a plurality of racks paralleling said guides, shaft means journaled on said one side frame, a plurality of gears fixed to said shaft means and meshing respectively with said racks, and motor means carried by said one side frame and operatively connected to drive said shaft means reversely.

4. In a bundler, base means, a first side frame mounted on said base means, a second side frame mounted on said base means, each side frame providing a slideway for supporting one end of each of a series of work pieces spanning said slideways, work advancing means associated with each side frame, means for driving said respective work advancing means synchronously, a series of pairs of work-performing units, one unit of each pair being supported from each side frame, said base means being formed to provide a plurality of guides arranged transversely relative to said slideways and one of said side frames being mounted for movement along said guides, meshing rack and gear means providing an operative connection between said base means and said one side frame, and motor means connected to drive said gear means reversely.

5. In combination, a first rotor and a second rotor mounted on spaced, parallel axes, an endless member trained over said rotors and having a driving connection with one of said rotors, a first shaft having a driving connection with said one rotor, a first gear on said first shaft, a first sprocket on said first shaft, a second shaft parallel with said first shaft, a second gear on said second shaft and meshing with said first gear, a second sprocket on said second shaft, endless means trained over said first and second sprockets and providing a driving connection therebetween, one of said gears being fixed on its shaft and the other of said gears being loose on its shaft, one of said sprockets being fixed on its shaft and the other of said sprockets being loose on its shaft, a clutch constructed and arranged selectively to provide an operative connection between said loose gear and its shaft, another clutch constructed and arranged selectively to provide an operative connection between said loose sprocket and its shaft, a unidirectional motor, a speed-varying transmission, means connecting said motor to drive said transmission, means connecting said transmission to drive said second shaft, means for engaging one of said clutches, and means actuated by movement of said endless member under the influence of said one clutch to disengage said one clutch and to engage said other clutch.

6. In combination, a conveyor affording a supporting surface for work pieces to be conveyed, a first series of rolls mounted on axes substantially perpendicular to said supporting surface adjacent one lateral boundary of said conveyor with a plane tangent to all of said rolls substantially parallel to the line of movement of pieces on said conveyor, a second series of rolls mounted on axes substantially perpendicular to said supporting surface adjacent the opposite lateral boundary of said conveyor with a plane tangent to all of the rolls of said second series substantially parallel to said first-named plane, a carriage supporting one of said series of rolls and mounted for movement transversely relative to the line of movement of pieces on said conveyor, fluid motor means for moving said carriage, and control means for said fluid motor means disposed for engagement by pieces moving on said conveyor past said series of rolls, said control means being constructed and arranged to activate said power means, when so engaged, to move said carriage toward the other of said series of rolls.

7. In a machine of the class described, means establishing a travel path for successive work pieces of material which is rigid in the direction of travel on said path, said pieces being of uniform, but variably-preselected, dimension in said direction, said travel path having an entrance end and a discharge end, a retainer station near the entrance end of said travel path, means at said retainer station to introduce a spacer element into said path and releasably to hold the same at said station with a predetermined degree of tenacity, pusher means in said pathway, means for driving said pusher means from a starting position to a limiting position, said starting position being between said travel path entrance end and said retainer station and spaced from said retainer station by a distance greater than the maximum selected value of said work piece dimension, and said limiting position being between said retaining position and said discharge end of said travel path, said driving means being effective to exert a force on said spacer element through such a work piece sufficient to overcome the tenacity of said holding means, said driving means acting further to return said pusher means from said limiting position to said starting position, means actuated upon release of said spacer element to drive said means at said retainer station to introduce a new spacer element into said path, and means for introducing work pieces successively into said travel path with their trailing edges positioned between said pusher starting position and said retainer station.

8. In a machine of the class described, means establishing a travel path for successive work pieces of material which is rigid in the direction of travel on said path, a plurality of work-performing stations serially spaced along said path, means for introducing work pieces successively to one end of said path, said pieces being of uniform, but variably-preselected, dimension in said direction, and means for advancing a series of such pieces past said work-performing stations intermittently in equal steps of a magnitude determined by said pre-selected dimension, said advancing means comprising guide means paralleling said travel path, a series of spacer elements arranged for independent, guided movement along said guide means, transfer means for introducing said spacer elements, one by one, to a work-piece intercepting position on said travel path at a point between said work-performing stations and said one end of said travel path, pusher means, drive means for moving said pusher means along said travel path from a starting point adjacent said one end of said travel path to a point between said intercepting position and said work-performing stations, said starting position being spaced from said intercepting position by a distance greater than the maximum preselected dimension of work pieces to be handled by the machine, and means actuated by movement of said pusher means past a position at which a spacer element is released from said intercepting position to activate said transfer means to introduce a further spacer element to said intercepting position.

9. The machine of claim 8 in which said pusher means comprises an element mounted for rectilinear reciprocation parallel with but spaced from said travel path, a lug carried by said reciprocable element and shiftable relative thereto between a first position projecting into said travel path and a second position removed from said travel path, and means holding said lug in said first position during travel of said reciprocable element toward said work-performing stations only.

10. The machine of claim 8 in which said pusher means comprises an element mounted for rectilinear reciprocation parallel with but spaced from said travel path, a lug hingedly carried by said reciprocable element for movement relative thereto about an axis transverse with respect to the line of movement of said reciprocable element between a first position projecting into said travel path and a second position removed from said travel path, and spring means yieldably holding said lug in said first position during travel of said reciprocable element toward said work-performing stations only.

11. The machine of claim 8 in which said pusher means comprises an endless element trained about a first rotor mounted on an axis transverse to the length of said travel path adjacent said one end of said path and about a second rotor mounted on an axis transverse to the length of said travel path and between said intercepting position and said work-performing stations, said endless element having a driving connection with one of said rotors and having a run close to but spaced from said travel path, a lug mounted on said one run and movable relative thereto between a first position projecting into said travel path and a second position removed from said travel path, spring means urging said lug into said first position but yieldable, upon movement of said endless element run away from said work-performing stations to permit said lug to move to its second position, said drive means acting to turn said one rotor in one direction to move said lug toward said work-performing stations and then to turn said one rotor in the opposite direction.

12. In a device of the class described, frame means providing a travel path for successive work pieces, means providing a closed orbital trackway having an advancing run closely adjacent and parallel with said travel path, a plurality of carriages mounted to travel freely in said trackway, each such carriage having a spacer lug projecting, when said carriage is located in said advancing run, into the path of a piece supported on said travel path, the return run of said trackway being so positioned that the lug of a carriage located in said return run is wholly outside said travel path, means disposed adjacent said trackway for periodically transferring carriages, one at a time, from said return run to said advancing run, means cooperating with said transferring means to retain a newly-transferred carriage yieldably against travel along said advancing run, and pusher means constructed and arranged to act against the trailing edge of a piece on said travel path to force the leading edge of said piece against the lug of such a newly-transferred carriage to overcome said yieldable retaining means and to advance said piece along said travel path and said carriage along said advancing trackway run.

13. The device of claim 12 including means for driving said transferring means, and means actuated by said pusher means after overcoming said yieldable retaining means to cause said driving means to operate said transferring means to transfer another carriage to said advancing run.

14. In a device of the class described, frame means providing a travel path for successive work pieces, said travel path having an entrance end and a discharge end, reciprocatory means mounted adjacent the entrance end of said travel path and including a unidirectionally-effective pusher element engageable with the trailing edge of a work piece on said travel path adjacent the entrance end thereof and operable to push said piece toward the discharge end of said travel path, means providing a closed orbital trackway having an advancing run closely adjacent and parallel with said travel path, a plurality of carriages mounted to travel freely in said trackway, each such carriage having a spacer lug projecting, when said carriage is located in said advancing run, into the path of a piece supported on said travel path, the return run of said trackway being so positioned that the lug of a carriage located in said return run is wholly outside said travel path, means disposed adjacent said trackway for periodically transferring a carriage from said return run to a position within said advancing run in which the lug of said carriage is disposed for engagement by the leading edge of a work piece located on said travel path for advancement by said reciprocatory means, means cooperating with said transferring means to retain a newly-transferred carriage yieldably against travel along said trackway toward the discharge end of said travel path, said reciprocatory means being effective to move the leading edge of a work piece into engagement with the lug of such a carriage and to overcome said retaining means to move said carriage toward the discharge end of said travel path, and means actuated by said reciprocatory means after overcoming said retaining means to cause said transferring means to transfer another carriage to said position within said advancing run of said trackway.

15. In combination, means providing a closed orbital trackway having an advancing run, a return run, a discharge end section joining the discharge end of said advancing run with one end of said return run, and a receiving end section joining the other end of said return run with the receiving end of said advancing run, a rotor mounted to span said other end of said return run and said receiving end of said advancing run, said rotor being formed to provide a socket having a mouth opening radially and arranged to sweep said receiving end section from said other end of said return run to said receiving end of said advancing run, a plurality of carriages guided in said trackway for individually-independent orbital travel therein, each such carriage having an engager part constructed and arranged to be cooperatively received in said rotor socket, yieldable means engageable with said rotor to hold the same releasably in an indexing position, means arranged adjacent said rotor and cooperating with said socket, when said rotor is in said indexing position, to block removal of a carriage engager part from said socket, power means engageable with a carriage when such carriage has its engager part so blocked, to overcome said yieldable means, thereby turning said rotor in a direction to move said socket out of cooperative association with said blocking means and forcing said carriage engager part out of said socket and said carriage into the receiving end of said trackway advancing run, and other power means activated upon movement of said carriage into said advancing run to drive said rotor in the same direction to return said rotor to said indexing position, said combination being constructed and arranged to ensure the presence of another of said carriages at said other end of said return run with its engager part positioned to be engaged in and entrained by said socket as said rotor is so driven.

16. In combination, means providing a closed orbital trackway disposed substantially in a vertical plane and having an upper advancing run, a lower return run, a discharge end section leading downwardly from the discharge end of said advancing run to one end of said return run, and a receiving end section leading upwardly from the other end of said return run to the receiving end of said advancing run, a rotor mounted to span said other end of said return run and said receiving end of said advancing run, said rotor being formed to provide a socket having a mouth opening radially and arranged to sweep said receiving end section from said other end of said return run to said receiving end of said advancing run, a plurality of carriages guided in said trackway for individually-independent orbital travel therein, each such carriage having an engager part constructed and arranged to be cooperatively received in said rotor socket, yieldable means engageable with said rotor to hold the same releasably in an indexing position, means arranged adjacent said rotor and cooperating with said socket, when said rotor is in said indexing position, to block removal of a carriage engager part from said socket, power means intermittently engageable with successive carriages when said carriages are successively held with their engager parts so blocked, to overcome said yieldable means, thereby turning said rotor in a direction to move said socket out of cooperative association with said blocking means and forcing the affected carrier engager part out of said socket and the carrier into said advancing run, whereby said carriages are caused successively to travel through said advancing run and into said discharge end section of said trackway, and other power means activated upon movement of each carriage into said advancing run to drive said rotor in the same direction to return said rotor to said indexing position, said combination being constructed and arranged to ensure travel of said carriages from said discharge end section through said return run to position said carriages successively at said other end of said return run with their engager parts successively positioned to be engaged in and entrained by said socket as said rotor is so driven.

17. In combination, means providing a closed orbital trackway disposed substantially in a vertical plane and having an upper advancing run, a lower return run, a discharge end section leading downwardly from the discharge end of said advancing run to one end of said return run, and a receiving end section leading upwardly from the other end of said return run to the receiving end of said advancing run, a rotor mounted to span said other end of said return run and said receiving end of said advancing run, said rotor being formed to provide a socket having a mouth opening radially and arranged to sweep said receiving end section from said other end of said return run to said receiving end of said advancing run, a plurality of carriages guided in said trackway for individually-independent orbital travel therein, each such carriage having an engager part constructed and arranged to be cooperatively received in said rotor socket, yieldable means engageable with said rotor to hold the same releasably in an indexing position, means arranged adjacent said rotor and cooperating with said socket, when said rotor is in said indexing position, to block removal of a carriage engager part from said socket, power means intermittently engageable with successive carriages when said carriages are successively held with their engager parts so blocked, to overcome said yieldable means, thereby turning said rotor in a direction to move said notch out of cooperative association with said blocking means and forcing the affected carrier engager part out of said notch and the carrier into said advancing run, whereby said carriages are caused successively to travel through said advancing run and into said discharge end section of said trackway, other power means activated upon movement of each carriage into said advancing run to drive said rotor in the same direction to return said rotor to said indexing position, and a slip-drive conveyor paralleling said return run and engageable with carriages successively delivered to said one end of said return run to move said carriages successively to a position at said other end of said return run at which their engager parts are located to be engaged in and entrained by said socket as said rotor is so driven.

18. In a machine of the class described, means establishing a travel path for successive stacks of pieces, means for advancing a succession of such stacks along said travel path, means travelling with such stacks to maintain separation between successive stacks, means for applying continuous binder tape to the lateral ends of said stacks during stack travel along said path, and means arranged adjacent each lateral boundary of said path beyond said tape-applying means for cutting the adjacent tape at the region of separation between stacks, each such cutting means comprising guide means paralleling said travel path, slide means reciprocably supported by said guide means, actuator means positioned in the path of successive separation-maintaining means for limited entrainment thereby, said actuator means having a driving connection with said slide means to move said slide means synchronously with said pieces throughout such entrainment, a cutter carried by said slide means and positioned thereon for registry with such region of separation throughout such entrainment, motor means operatively connected to said cutter, and control means for said motor means, said control means being actuated by said actuator means, upon initiation of such entrainment, to move said cutter through said tape and into such region of separation and then to withdraw said cutter.

19. In a machine of the class described, means establishing a travel path for successive stacks of pieces, means for advancing a succession of such stacks along said travel path, means travelling with such stacks to maintain separation between successive stacks, means for applying continuous binder tape to the lateral ends of said stacks during stack travel along said path, and means arranged adjacent each lateral boundary of said path beyond said tape-applying means for cutting the adjacent tape at the region of separation between stacks, each such cutting means comprising guide means paralleling said travel path, slide means reciprocably supported by said guide means, a rock shaft oscillable about an axis transverse to said travel path, a first lever fixed to said rock shaft, spring means yieldably holding said lever with its distal end in position for limited entrainment by successive separation-maintaining means, a second lever fixed to said rock shaft and operatively engaging said slide means, the effective lengths of said levers being equal, motor means carried by said slide means, a cutter mounted to move with said slide means and positioned for registry with the region of separtion between adjacent stacks throughout such entrainment, said motor means having a driving connection with said cutter to move said cutter through the adjacent tape when energized and then to withdraw said cutter, and means moving with said rock shaft to energize said motor means upon initiation of such entrainment.

References Cited by the Examiner

UNITED STATES PATENTS

| | | | |
|---|---|---|---|
| 1,235,690 | 8/17 | Jagenberg | 53—137 |
| 2,263,739 | 11/41 | Rose | 53—374 |
| 2,853,177 | 9/58 | Engleson | 198—35 |
| 2,920,737 | 1/60 | Engleson | 198—29 |
| 3,045,402 | 7/62 | Keely | 53—137 |

FRANK E. BAILEY, *Primary Examiner.*

BROMLEY SEELEY, *Examiner.*